(12) United States Patent
Grek et al.

(10) Patent No.: US 7,292,616 B2
(45) Date of Patent: Nov. 6, 2007

(54) $CO_2$ LASER STABILIZATION SYSTEMS AND METHODS

(75) Inventors: Boris Grek, Hayward, CA (US);
Michael Weitzel, San Jose, CA (US);
Igor Landau, Palo Alto, CA (US)

(73) Assignee: Ultratech, Inc., San Jose, CA (US)

( * ) Notice: Subject to any disclaimer, the term of this patent is extended or adjusted under 35 U.S.C. 154(b) by 428 days.

(21) Appl. No.: 11/054,052

(22) Filed: Feb. 9, 2005

(65) Prior Publication Data

US 2006/0176917 A1    Aug. 10, 2006

(51) Int. Cl.
*H01S 3/22* (2006.01)
*B23K 26/00* (2006.01)
*B23K 26/04* (2006.01)

(52) U.S. Cl. ............ 372/55; 219/121.61; 219/121.62
(58) Field of Classification Search ............... 372/55; 219/121.61, 121.62
See application file for complete search history.

(56) References Cited

U.S. PATENT DOCUMENTS 6,747,245 B2   6/2004   Talwar et al. ............ 219/121.8

2002/0185474 A1*  12/2002  Dunsky et al. .......... 219/121.7
2006/0000812 A1*   1/2006  Weber et al. .......... 219/121.61

* cited by examiner

*Primary Examiner*—Minsun Harvey
*Assistant Examiner*—Marcia A. Golub
(74) *Attorney, Agent, or Firm*—Allston L. Jones

(57) ABSTRACT

Systems and methods for stabilizing a $CO_2$ laser are disclosed. The system includes a detector unit for measuring the power in a select portion of the output beam. The detector unit generates an electrical signal corresponding to the measured power. The modulation frequency of the signal used to modulate the relatively high-frequency radio-frequency (RF) pump signal is filtered from the electrical signal. The filtered electrical signal is then compared to a desired value for the output power in the output beam. Based on the comparison, a modulation control signal for modulating the RF pump signal is formed. The modulation control signal has a varying duty cycle that varies the amount of laser pump power to reduce or eliminate the measured variations in the output beam power. The result is an output beam power that remains stable over time.

4 Claims, 6 Drawing Sheets

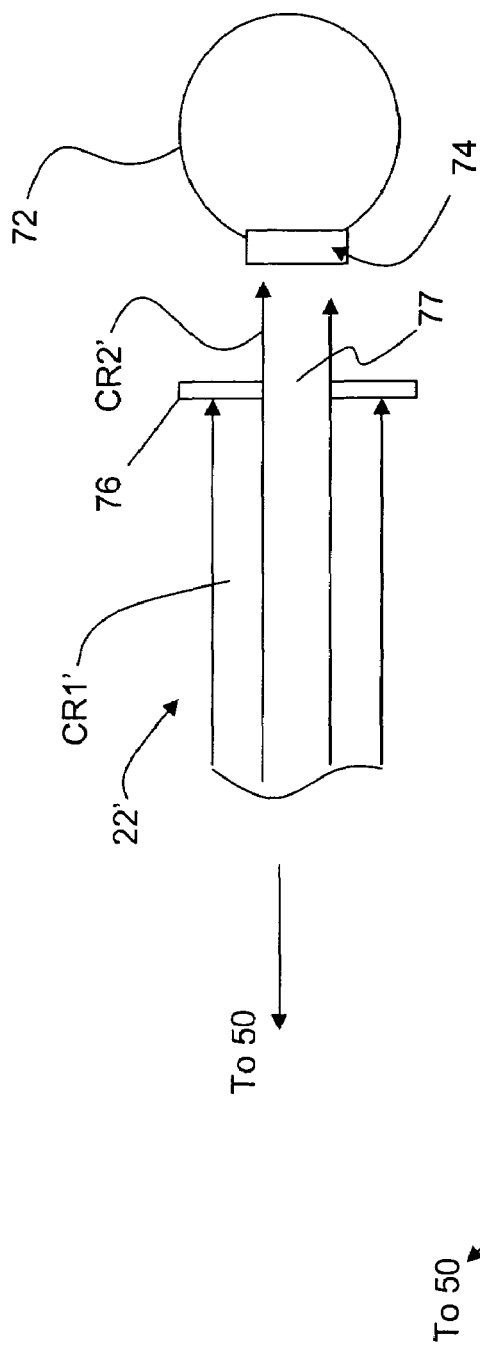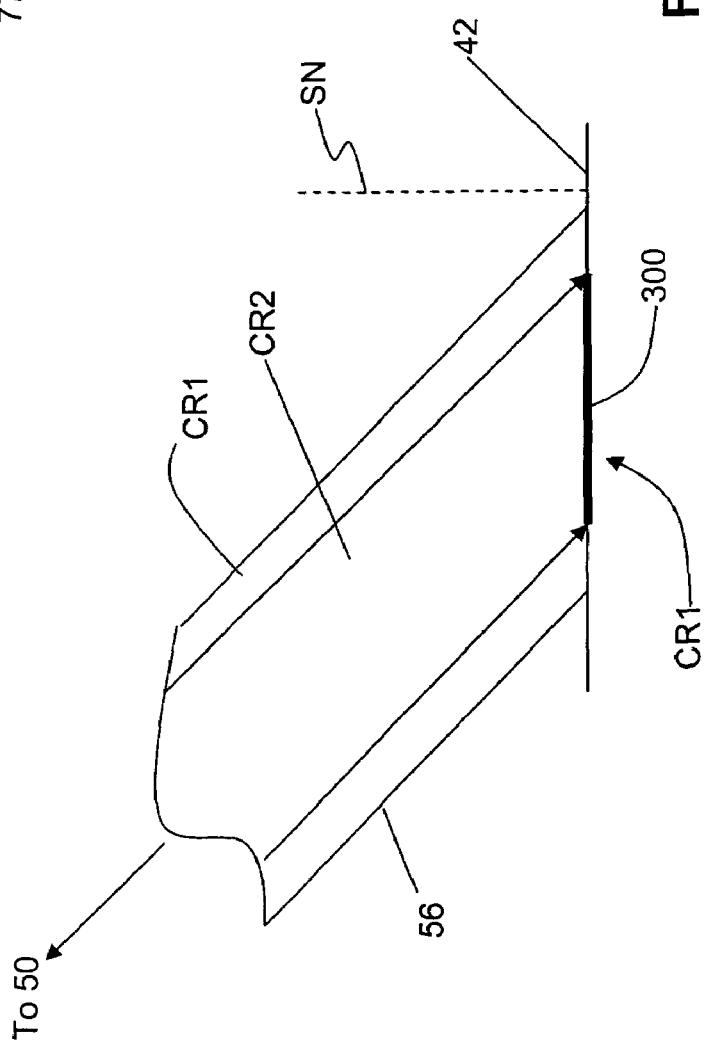
FIG. 3B
FIG. 3A

$CO_2$ LASER STABILIZATION SYSTEMS AND METHODS

CROSS-REFERENCE TO RELATED APPLICATIONS

The present invention is related to U.S. Pat. No. 6,747,245, entitled "Laser Scanning Apparatus and Method for Thermal Processing"; U.S. patent application Ser. No. 10/787,664, entitled "Laser Scanning Apparatus and Methods for Thermal Processing" filed on Feb. 26, 2004; U.S. patent application Ser. No. 10/806,014, entitled "Laser Scanning Apparatus and Methods for Thermal Processing", filed on Mar. 22, 2004, and U.S Published Patent Application 20040173585 on Sep. 09, 2004; U.S. patent application Ser. No. 10/674,106, entitled "Method of Annealing Undoped Silicon Substrates", filed on Sep. 29, 2003; and U.S. patent application Ser. No. 10/762,861, entitled "Laser Thermal Annealing of Lightly Doped Silicon Substrates", filed on Jan. 22, 2004, all of which are assigned to the present Assignee, Ultratech, Inc. of San Jose, Calif., and all of which are incorporated by reference herein.

BACKGROUND OF THE INVENTION

1. Field of the Invention

The present invention relates to systems and methods for stabilizing lasers, and $CO_2$ lasers in particular.

2. Description of the Prior Art

A $CO_2$ laser uses gaseous $CO_2$ as the gain medium. The laser beam is formed by the energy state transitions between vibrational and rotational states of the $CO_2$ molecules that emit radiation at infrared wavelengths between 9 and 11 microns, and typically at 10.6 microns. At this wavelength, many materials such as glass, plastics, water, and certain types of silicon (e.g. doped silicon) are relatively opaque.

In a common form of a $CO_2$ laser, the $CO_2$ gain medium resides between two electrodes and is excited by a radio-frequency (RF) oscillator to generate a plasma. The RF excitation is modulated at a frequency of about 120 kHz, with a duty cycle ranging anywhere from about 18% to about 88%. The modulation is used to prevent arcing, i.e., the formation of a preferred electrical path through the RF-generated plasma, which results in an electrical short between the electrodes. The modulation also provides for relaxation time for the gain medium to recharge. Unfortunately, the modulation requirement for RF-excited $CO_2$ lasers makes direct analog feedback control impossible.

Commercial $CO_2$ lasers are available from a number of manufacturers (e.g., Coherent, Inc., Santa Clara, Calif.), and can have very high continuous output power to levels (e.g., 300 W from the commercially available DIAMOND™-K-300 from Coherent, Inc.). Specially constructed $CO_2$ lasers are capable of generating tens of Megawatts of continuous wave output power.

$CO_2$ lasers are capable of producing a very high output power relative to other types of lasers because of their relatively high efficiency. The typical efficiency for a $CO_2$ laser (measured as the ratio of input electrical power to output optical power) typically ranges from about 5 to 20 percent, which is about 100× greater than that for the more common types of lasers, such as helium-neon, argon-ion or krypton-ion lasers.

Because of their high power and IR wavelength output, $CO_2$ lasers have found wide applications in industry, from medical applications to semiconductor processing, to welding and cutting operations.

One recently developed application for $CO_2$ lasers is laser thermal annealing or "LTA" (also referred to more generally as laser thermal processing or "LTP") of semiconductor substrates in semiconductor manufacturing. The LTP process is described in detail in U.S. Pat. No. 6,747,245.

A key requirement for LTP is that the laser heating be relatively uniform over the wafer being processed. For example, when performing LTP for the non-melt annealing of junctions on a silicon wafer, the maximum annealing temperature seen by any point on the wafer must be within about ±10° C., and preferably within ±5° C. This requires a laser power stability (i.e., variation in power vs. time) of about 0.35%. Unfortunately, commercially available $CO_2$ lasers exhibit a stability of about ±8%, which translates into a temperature variation during annealing of about ±100° C. at the required annealing temperate of 1,300° C.

It is anticipated that other industrial applications using $CO_2$ lasers will be developed that will require, or that would benefit from, a greater degree of stability in the output beam power or from feedback control of the beam power from a substrate temperature measurement system.

SUMMARY OF THE INVENTION

A first aspect of the invention is a method of stabilizing an output beam from a $CO_2$ laser pumped by radio-frequency (RF) energy modulated at a modulation frequency. The method includes measuring an output power of the output beam and generating a first signal corresponding to the measured output power. The method also includes removing the modulation frequency from the first signal to form a filtered first signal. The method further includes forming from the filtered first signal a modulation control signal that has varying duty cycle. The varying duty cycle is adapted to compensate for variations in the output power. The method also includes providing the modulation control signal to the laser to stabilize the laser's output power.

A second aspect of the invention is a system for stabilizing the power in the output laser beam from a $CO_2$ laser, where the laser is pumped by a modulated radio frequency (RF) signal. The system includes a detector unit arranged to measure the output power and generate a corresponding electrical signal. A conditioning electronics unit is operably coupled to the detector unit. The conditioning electronics unit is adapted to remove the modulation frequency from the electrical signal to form a conditioned electrical signal. The modulation frequency is present in the electrical signal because the output laser beam includes the modulation component used to pump the laser. A pulse-width modulation (PWM) controller is operably coupled to the conditioning electronics. The PWM controller is adapted to receive the conditioned electrical signal and form therefrom a modulation control signal having a duty cycle that varies to compensate (e.g., reduce or eliminate) variations in the measured output power.

A third aspect of the invention is a laser thermal processing (LTP) system for processing a substrate that has a surface. The system includes a radio-frequency (RF)-pumped $CO_2$ laser that is stabilized using the laser stabilization system, described briefly above, so that the $CO_2$ laser generates a stabilized output beam. The LTP system also includes a beam-directing element arranged to direct a portion of the stabilized output laser beam to an optical system adapted to form an LTP beam. The LTP system forms an image at the substrate surface, where the image is capable of heating the substrate surface. The system also includes a chuck adapted to support the substrate, and a stage adapted to movably support the chuck to move the substrate relative to the image to effectuate scanning of the image over the substrate to thermally process the substrate.

A fourth aspect of the invention is a method for thermally processing a substrate. The method includes generating a stabilized output laser beam from a $CO_2$ laser, wherein the stabilized output beam has an amount of power that, as measured over a portion of the output beam, varies very little over time, e.g., by no more than 1% over a 24 hour period. The method also includes directing a portion of the output beam to an optical system adapted to form an LTP beam capable of heating the substrate. The method further includes directing the LTP beam to the substrate to heat the substrate.

BRIEF DESCRIPTION OF THE DRAWINGS

FIG. 3A is a close-up schematic side view of the LTP beam (56) of the LTP system of FIG. 1 as viewed in the long direction of the line image (300), wherein the LTP beam is incident on the substrate at an incident angle relative to the substrate normal direction, and illustrating how the beam central region CR2 forms the line image;

FIG. 3B is a close-up schematic side view of the laser beam portion (22') of the LTP system of FIG. 1, illustrating an example embodiment that includes a mask placed upstream of, and adjacent, the integrating sphere so that only the central region (CR2) of laser beam portion (22') enters the integrating sphere;

Figure 1:
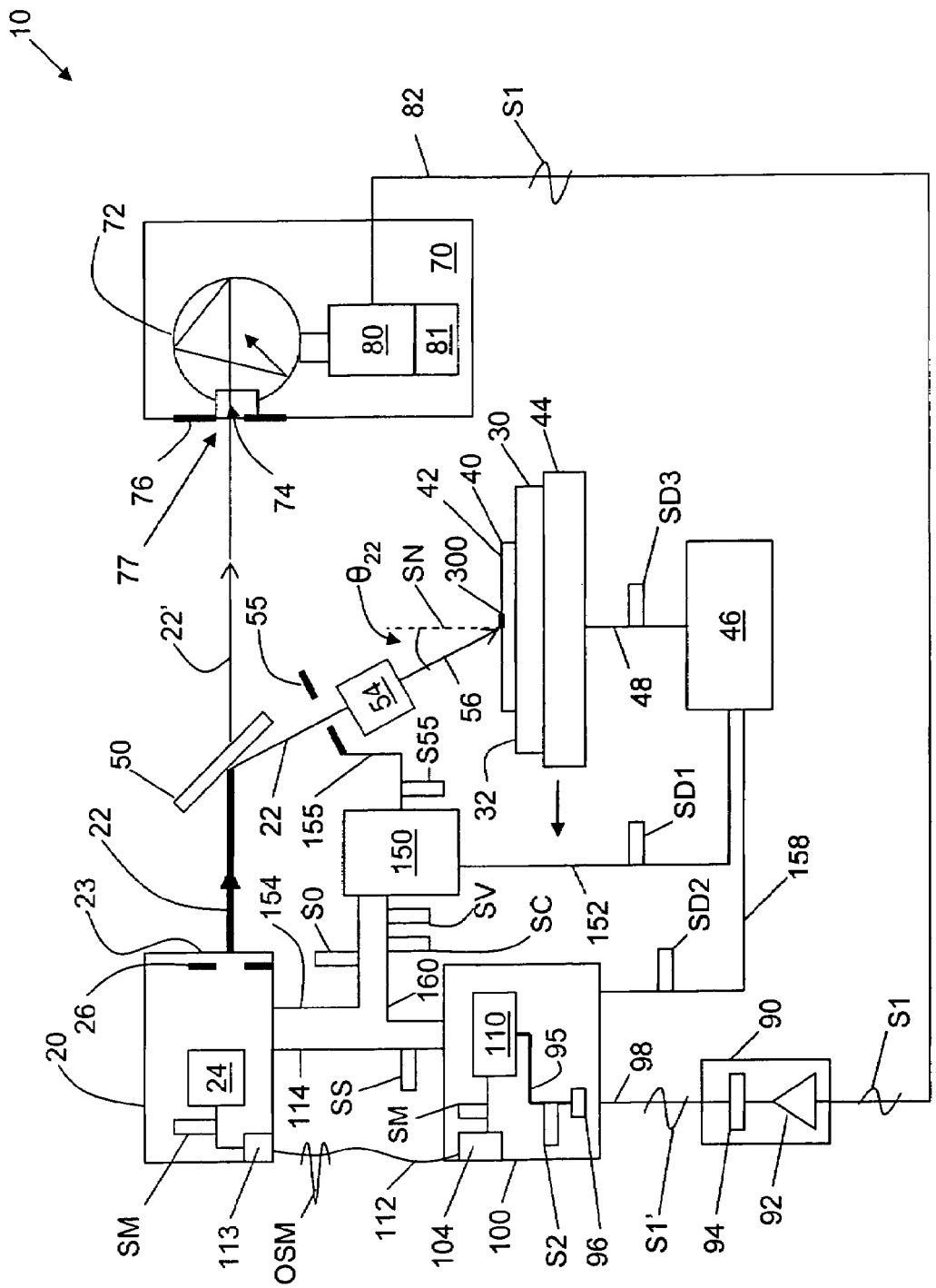
FIG. 1 is a schematic diagram of an LTP system that includes a $CO_2$ laser and a feedback control system adapted to stabilize the output power of the laser beam generated by the laser.

The various elements depicted in the drawings are merely representational and are not necessarily drawn to scale. Certain proportions thereof may be exaggerated, while others may be minimized. The drawings are intended to illustrate various implementations of the invention, which can be understood and appropriately carried out by those of ordinary skill in the art.

DETAILED DESCRIPTION OF THE INVENTION

The present invention relates to $CO_2$ lasers, and in particular to systems and methods of stabilizing the power output of same. Here, the word "stabilized" refers to reducing or eliminating variations in the amount of power output from the laser. The systems and methods are first described in connection with a generalized embodiment of an LTP system that includes a stabilized $CO_2$ laser. The details of the elements making up the control loop are then set forth.

LTP System with Laser Stabilization

FIG. 1 is a schematic diagram of an LTP system 10 that includes a $CO_2$ laser 20 that generates a quasi-continuous wave output laser beam 22 at a laser output end 23. For reasons discussed below, this quasi-continuous output beam can be considered a continuous-wave (CW) output beam from the viewpoint of performing LTP.

Laser 20 includes an RF source 24 for pumping the laser, and a shutter 26 within the laser adjacent output end 23. In an example embodiment, shutter 26 is opened to create output laser beam 22.

LTP system 10 also includes a chuck 30 having an upper surface 32 adapted to support a substrate (e.g., a semiconductor wafer) 40 having an upper surface 42. In an example embodiment, chuck 30 is cooled. Chuck 30 is supported by a movable stage 44 operably coupled to a stage driver 46, e.g., via an electrical line 48.

The majority of laser beam 22 is directed by a beam-directing member 50 (e.g., a cooled, partially-transmitting mirror) to an optical system 54. Optical system 54 receives laser beam 22 and forms therefrom an LTP beam 56 that irradiates substrate surface 42 at an incident angle $\theta_{22}$ relative to a substrate surface normal SN. In a preferred embodiment, incident angle $\theta_{22}$ is Brewster's angle. In an example embodiment, a shutter 55 is arranged between beam-directing member 50 and substrate 40 to provide additional control over the irradiation of the substrate without having to turn off the laser or substantially vary the laser power seen by most of the optical train.

With continuing reference to FIG. 1, LTP system 10 further includes a detector unit 70 arranged so that it can receive a small portion of laser beam 22. For example, detector unit 70 is arranged adjacent beam-directing member 50, which reflects most of laser beam 22 to optical system 54, but that also transmits a small portion 22' of laser beam 22 to detector unit 70.

In an example embodiment, detector unit 70 includes an integrating sphere 72 with an acceptance aperture 74 arranged to receive laser beam portion 22'. A low-noise, high-speed photodetector 80 capable of detecting 10.6 micron radiation is optically coupled to the integrating sphere. In an example embodiment, photodetector 80 is a cooled mercury-cadmium-telluride (HgCdTe) detector. Cooling of photodetector 80 is achieved, for example, via liquid nitrogen or via triple-stage electronic cooling, from a cooling unit 81 operably coupled to the photodetector. Cooling of photodetector 80 is preferred so that the analog electrical signal S1 (discussed below) generated by the detector has a higher signal to noise ratio, and so that the signal is influenced less by the ambient (background) temperature.

Figure 2:
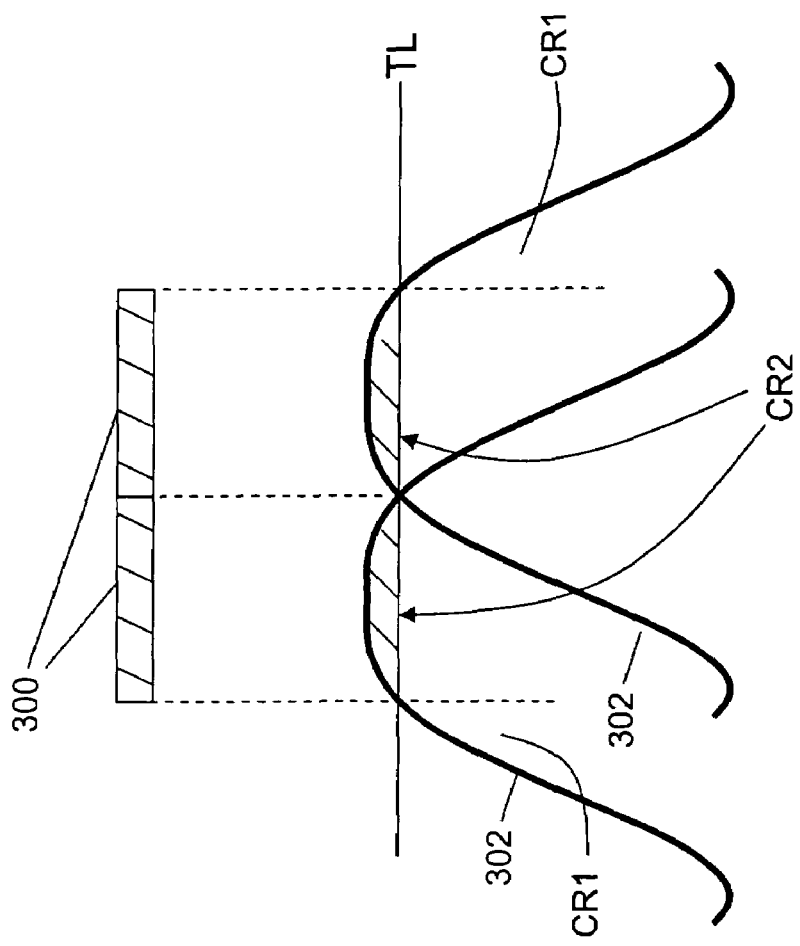
FIG. 2 is a cross-sectional schematic diagram of the intensity profile of the LTP beam for two adjacent scans, along with the corresponding line images in plan view, illustrating the overlap of the LTP beam between two adjacent scans, and illustrating the LTP beam central region CR2 surrounded by the outer region CR1.

FIG. 2 shows the intensity distributions 302 measured along the length of two adjacent line images 300 on the substrate. Also shown in FIG. 2 is a plan view of the substrate and portions of two adjacent scan paths and associated adjacent line images 300 formed at substrate surface 42 by LTP beam 56. The intensity distributions are integrated across the width of the beam and are measured as a function of the distance along the length of the line image. A threshold intensity TL is shown that corresponds to the intensity value that defines the effective line image length. Beam intensities above this threshold value heat the substrate to the processing temperature $T_A$ for the given dwell time. Below threshold intensity TL, there is insufficient energy to heat the substrate to the processing temperature. Thus, with reference also to FIG. 3A, LTP beam 56 is divided into an outer region CR1 on either side of a central region CR2, wherein the central region of the beam defines the effective length of the line image. Accordingly, in an example embodiment, it is advantageous in LTP to measure the intensity of laser beam portion 22' corresponding to the central region CR2', and discard the surrounding outer region CR1', as illustrated in FIG. 3A.

With continuing reference to FIG. 2, adjacent scans are generally overlapped so that the variation in maximum intensity seen by any point on substrate surface 42 is a few percent or less. Where the beams are overlapped, the minimum intensity is at a threshold level TL. Thus, only the central region CR2 of the beam, defined as that portion of the beam having an intensity above an intensity threshold level TL is useful in forming line image 300. In an example embodiment, the intensity threshold level TL is about 1% below the peak intensity.

With reference to FIG. 3B and also to FIG. 1, in an example embodiment, a mask 76 with a central aperture 77 is arranged immediately adjacent aperture 74 so that only the effective central region CR2' of laser beam 22'—e.g., the region associated with heating the substrate to the processing temperature during LTP with central region CR2 of LTP beam 56—is admitted to integrating sphere 72 through the mask central aperture.

With reference again to FIG. 1, detector unit 70 is operably coupled, e.g., via electrical line 82, to a conditioning electronics unit 90. Unit 90 includes, in series, an amplifier 92 and a high-frequency filter 94. Unit 90 is operably coupled, e.g. via electrical line 98, to a pulse-width modulation (PWM) controller 100, which in an example embodiment includes a field-programmable gate array (FPGA) 110 programmed to perform pulse-width modulation of a 120 kHz signal, as described in greater detail below. In an example embodiment, PWM controller 100 also includes an analog-to-digital (A/D) converter 96.

PWM controller 100 in turn is operably coupled to RF source 24 in $CO_2$ laser 20, preferably via an optical fiber link 112. In an example embodiment, FPGA 110 is clocked at a relatively high clock rate (e.g., 100 MHz) and is programmed to perform pulse-width modulation control, as described below. PWM controller 100 is also operably coupled to laser 20, e.g., via an electrical line 114, to receive status signals SS from the laser that include, for example, whether the laser is on or off, how much electrical power is being consumed by the laser, etc.

It should be noted that during LTP, the dwell time of image 300 at any point on substrate surface 42 is typically about 1 millisecond. This corresponds to about 120 "modulation pulses" delivered to each point on surface 42 that is scanned by image 300. Accordingly, the laser power appears to be operating in a CW mode from the viewpoint of performing LTP.

LTP system 10 also includes a main controller 150 operatively coupled to laser 20, shutter 55, stage driver 46, and PWM controller 100. Main controller 150 is adapted to control and coordinate the movement of stage 44 via a control signal SD1, the operation of laser 20 (including shutter 26 therewithin) via a control signal S0, and the opening and closing shutter 55 via a control signal S55 that travel over respective lines 152, 154 and 155. Main controller 150 thus operates to ensure that LTP beam 56 is properly scanned over substrate surface 42 to process the substrate. Further, PWM controller 100 is operably coupled to stage driver 46 (e.g., via electrical line 158) and to main controller 150 (e.g., via electrical line 160) so that FPGA 110 can receive information about the status of the stage via a stage signal SD2, as well as other information sent to or inputted to the main controller, such as a desired power set-point level (e.g., provided to FPGA 110 as a voltage $V_{SP}$) for a desired threshold amount of power in the outputted laser beam 22.

Method of Operation

Laser Stabilization

With continuing reference to FIG. 1, in the operation to stabilize laser 20, in an example embodiment controller 150 sends a control signal S0 to laser 20 to initiate the operation of the laser, including activating RF source 24 and opening shutter 26. In response thereto, laser beam 20 generates laser radiation at a wavelength of 10.6 microns, in the form of laser beam 22.

Laser beam 22 proceeds to beam-directing member 50, which directs most of the beam to optical system 54, while allowing laser beam portion 22' to proceed to detector unit 70. Laser beam portion 22' passes through aperture 77 of mask 76, which truncates the beam portion so that only the central region CR2 of the beam enters aperture 74 of integrating sphere 72.

The radiation in laser beam portion 22' that enters integrating sphere 72 is integrated therein, i.e., is diffusely scattered from the interior walls of the integrating sphere. This integration minimizes interference effects that adversely affect the detection process.

Photodetector 80 detects a select portion of the integrated radiation sampled by integrating sphere 72 and generates a corresponding analog electrical signal S1. Electrical signal S1 proceeds via line 82 to conditioning electronics unit 90. Amplifier 92 amplifies signal S1 and filter 94 filters the amplified signal to remove high-frequency components to create a conditioned signal S1' For example, the frequency used to modulate RF source 24, which generates the 80 MHz laser excitation frequency, is typically 110-120 KHz. This laser modulation frequency needs to be removed by the conditioning unit so that it does not result in control loop instability.

The conditioned analog signal S1' output from filter 94 has a voltage corresponding to the detector output signal S1. Conditioned analog signal S1' is converted to a corresponding conditioned digital signal S2 via A/D converter 96 in PWM controller 100. Signal S2 has a digital value that corresponds to the voltage level of the analog signal and the laser intensity sampled by the measurement system. Because the analog signal S1 is filtered (conditioned) to form signal S1', digital signal S2 includes only relatively low-frequency information, e.g., frequency content of say 10KHz and below, if filter 94 is a 10 KHz low-pass filter. In an example embodiment, digital signal S2 is placed on a multiwire bus 95 having a number of wires (e.g., 16 wires, not shown), with each wire corresponding to a different order bit in a 16 bit word describing the corresponding amplitude of the analog signal. The servo bandwidth controlling the laser output power is limited to low-frequencies included in the frequency content of digital signal S2. Digital signal S2 is then transmitted to FPGA 110 within PWM controller 100.

FPGA 110 is programmed to generate a pulse-width-modulated output signal SM (hereinafter, "modulation control signal"). Modulation control signal SM has a duty cycle roughly proportional to the desired laser output, but that varies depending on the difference between a programmed set-point value corresponding to the desired laser power and the measured laser power. In an example embodiment, modulation control signal SM is converted to an optical modulation control signal OSM generated at optical transmitter 104. Optical modulation control signal OSM then travels over fiber link 112 to optical receiver 113 in laser 20, which converts optical modulation control signal OSM back to electrical modulation control signal SM. The benefit of using an optical fiber link 112, as opposed to an electrical link, is that the optical link provides electrical isolation of the signal used to control the laser 20. Thus, spurious electronic noise that might be generated by a ground-loop does not adversely affect modulation control signal OSM.

Figure 4:
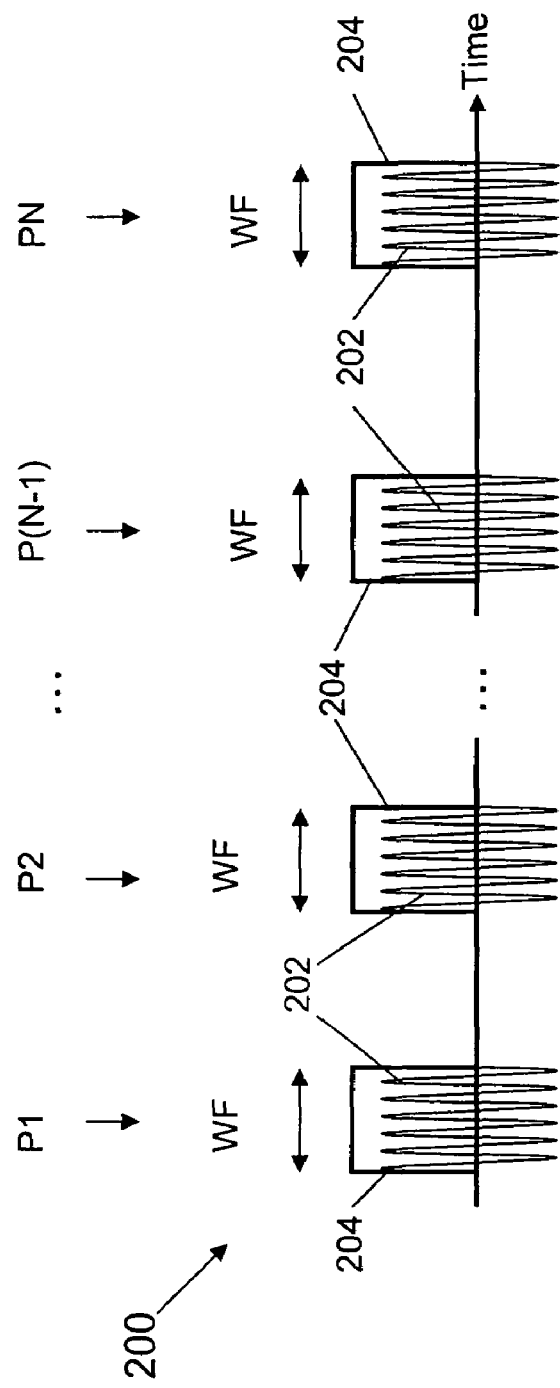
FIG. 4 is a schematic diagram of an idealized uncompensated laser modulation control signal envelope used to modulate the high-frequency laser excitation signal (~80 MHz) at a lower modulation frequency (~120 kHz) to create bursts of excitation energy to pump the $CO_2$ gas, wherein the idealized modulation control signal envelope shown in the Figure illustrates a constant duty cycle associated with constant laser output power, i.e., perfect laser stability.

FIG. 4 is a schematic diagram showing an idealized, uncompensated, modulated, excitation signal 200 generated by RF source 24. Excitation signal 200 includes an 80 MHz sinusoidal RF pump signal 202 (not shown to scale) used to excite the vibrational modes of the $CO_2$ molecules in laser 20. The 80 MHz excitation signal 202 is modulated at ~120 kHz, as illustrated by the square-wave envelope 204, so that there is about 400-500 cycles of the excitation frequency in each duty cycle or modulation pulse P. Four separate pulses P are shown for signal 200: Pulse P1, P2, P(N-1) and PN, illustrating the beginning and the end of a relatively long train of pulses (e.g., N=200).

Figure 5:
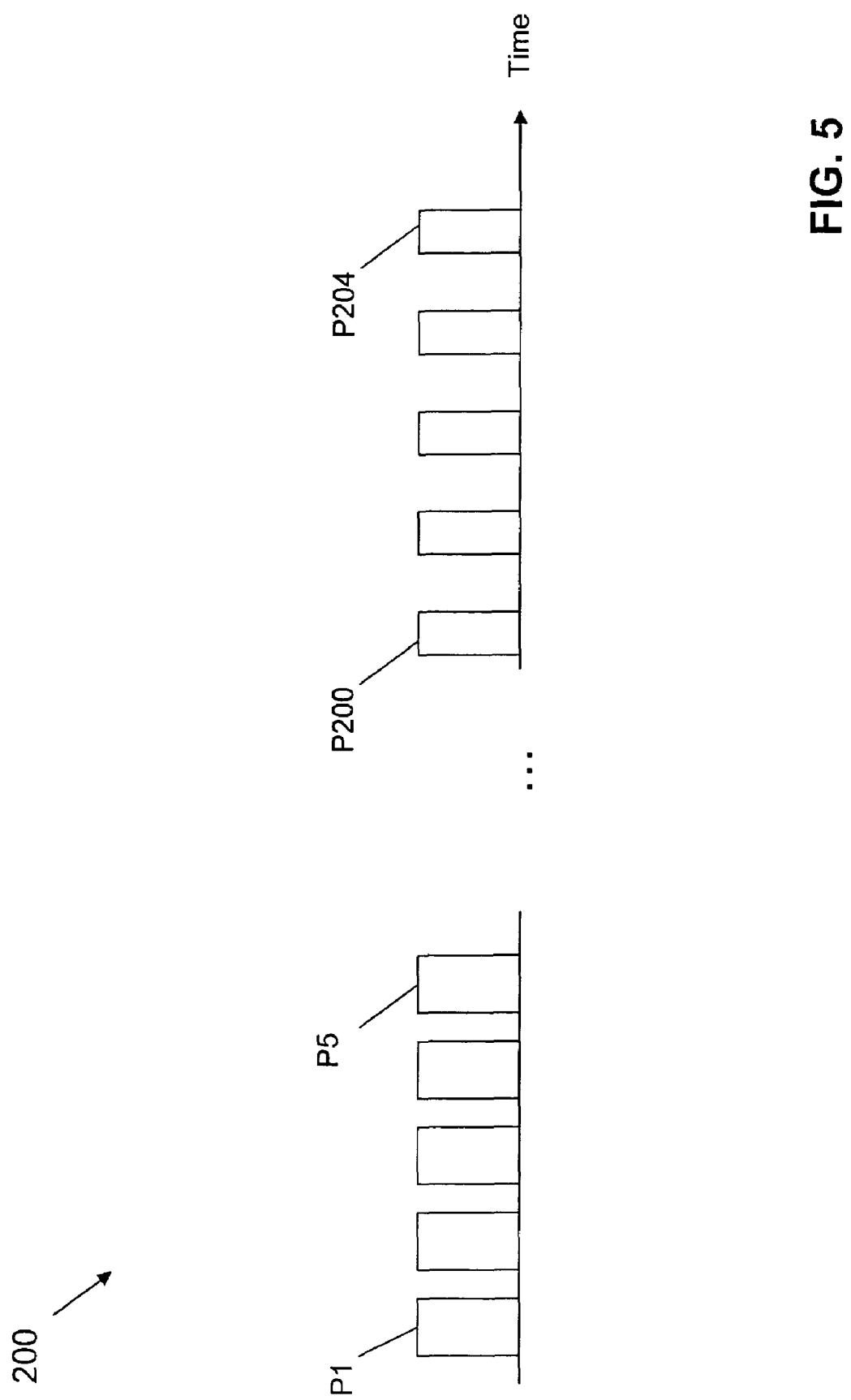
FIG. 5 is a schematic diagram of an actual laser modulation control signal envelope that illustrates a change in duty cycle or the modulation pulse width that occurs after a relatively large number N (e.g., N~200) of pulses, which results in a variation in the output power of the laser.

For an idealized modulation control signal 200 of FIG. 4, each modulation pulse P has a fixed duty cycle or pulse width WF. In principle, this should result in an output beam having a constant output power. However, due to various causes, such as changes in the laser cavity temperature, the laser output power can and typically does vary with time, e.g., on the order of 6% over an hour of operation. This can be compensated by changing the duty cycle of modulation control signal 200, as illustrated in FIG. 5, which represents a control signal 200 with initial pulses P1 through P5, and then later pulses P200 through P204. Note that pulses P200 through P205 show a change in the modulation pulse width relative to the initial pulses P1 through P5. Since the control loop that changes the width of the modulation pulses may have a bandwidth of only 1 kHz, the change in modulation pulse width would only be apparent after 50 or so pulses.

Figure 6:
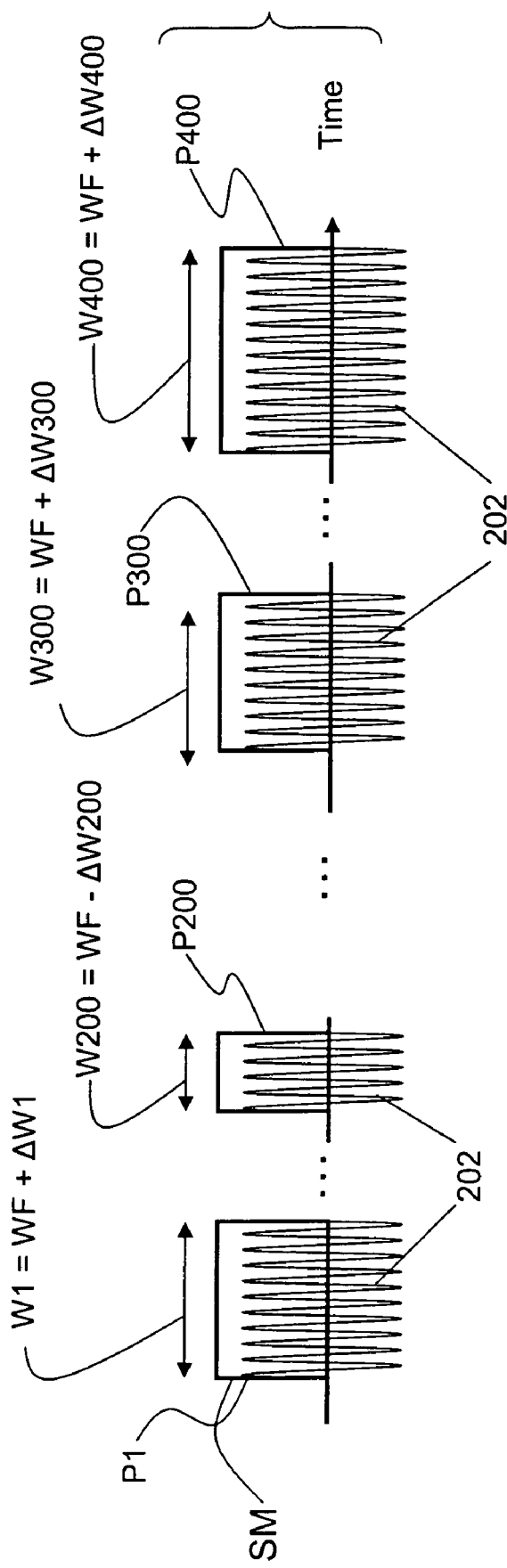
FIG. 6 is a schematic diagram illustrating an example modulation control signal similar to that of FIG. 4 that has a duty cycle that varies to stabilize the power in the outputted laser beam.

FIG. 6 is a schematic diagram of a closed-loop modulation control signal SM (see also FIG. 1) showing example pulses P1, P200, P300 and P400, along with the 80 MHz sinusoidal RF pump signal 202. In the example of FIG. 6, rather than having a Fixed pulse width WF as for the idealized modulation control signal 200 of FIG. 4, the pulse widths W in modulation control signal SM change to compensate for the variation in the power of output laser beam 22. In the example of FIG. 6, the modulation duty cycle changes from W1=WF+ΔW1, to W200=WF+ΔW200, to W300=WF+ΔW300, and to W400=WF+ΔW400 to adjust the laser output power level over time so that a constant power is measured by detector 80. Modulation control signal SM has a fixed repetition frequency, e.g., 120 KHz, but the pulse widths W are varied ("modulated") so that the 80 MHz laser excitation signal 202 (FIG. 4) is "on" for either shorter or longer times to compensate for the variations in laser power. This controls the output of laser 20 so that the power measured by detector 80 varies by only a very small amount, and the effective power focused on the substrate varies, in an example embodiment, by 0.2% or less over a period of hours or days.

The inventors also found that, in practice, the intensity profile of laser beam 22 changed with time, shifting the proportion of power contained in the effective width in the center of the beam versus that contained in the beam wings. Sampling the entire beam to determine the power in the central portion containing the effective width was therefore prone to error. By measuring only the power in the portion of the beam that is effective in processing of the wafer (e.g., measuring the power in the central region CR1), it is possible to substantially reduce this error. Similarly, temporal changes occur in the reflective and/or transmission efficiencies in the components in the beam path between laser 20 and the substrate 40. If the beam power is measured immediately at the output of the laser, these changes cannot be taken into account. Thus, in an example embodiment, the beam power is sensed as close as possible to the substrate.

In order that the laser modulation not result in a noticeable variation in the maximum processing temperature along the scanning direction, it is desirable to keep the spatial wavelength associated with the modulation frequency significantly less than the width of image 300 of LTP laser beam 56. For example, assume that LTP laser beam 56 is focused at substrate surface 42 into a 0.1 mm wide line image 300 scanned at 125 mm/s to produce a 0.8 millisecond dwell time at substrate 40. In this case, the spatial dimension corresponding to a cycle of the laser modulation is about 1 micron, assuming a 120 kHz modulation frequency in control signal OSM. This is small compared to the 100 micron width of the image 300, thus satisfying the stated requirement.

Also, it should be noted that the sampling rate of detector unit 70 and FPGA 110 is relatively high (e.g., 250 kHz), and thus is significantly greater than the 120 kHz laser modulation frequency.

It is important that the feed-back control system described above not damage the laser if it should fail for some reason. Accordingly, in an example embodiment, PWM controller 100 includes control logic (referred to herein as a "PWM monitor") that determines if the feed-back control system is operating within the safe limits. If not, the PWM monitor generates a shut-down signal that directly shuts down the laser operation, e.g., by closing shutter 26, or by shutting down RF source 24, or both. In an example embodiment, the PWM monitor is programmed into FPGA 110.

LTP Operation

In the operation of LTP system 10, controller 150 provides FPGA 110 with a power set-point via a control signal SV with a set-point voltage $V_{SP}$. The power set-point voltage $V_{SP}$ corresponds to a desired limit on the amount of power in the outputted laser beam 22. Also, controller 150 provides to FPGA information relating to the motion of stage 40 (and thus the location of LTP beam 56 on substrate 40), and the operation of shutters 26 and 54. This information is provided to (e.g., is programmed into) FPGA 110, via respective signals SD2, SS and SC. This information allows for operating stabilized laser 20 as part of LTP system 10.

The portion of laser beam 22 directed from beam-directing member 50 to optical system 54, which is used for annealing, has a uniform power level as a function of time due to the stabilization of the output power of laser 20, as described above. In an example embodiment, laser output beam 22 is stabilized so that it has an amount of power that, as measured over at least a portion of the output beam (e.g., just the center portion CR2 associated with forming line image 300), varies by no more than 1% over a 24 hour period.

Optical system 54 forms LTP beam 56 from laser beam 22. The LTP beam 56 is focused at substrate surface 42 to form an image 300, preferably a line image. Main controller 150 also sends shutter control signal S55 to shutter 55 to open the shutter so that laser beam 22 can proceed to optical system 54.

In addition to activating laser 20 to generate laser beam 22, main controller 150 sends a stage driver control signal SD1 to stage driver 46, which in turn sends a drive signal SD3 to stage 44 to cause the stage, and thus the chuck and the substrate, to move. The movement of substrate 40 relative to image 300 scans the image over the substrate surface.

In the foregoing Detailed Description, various features are grouped together in various example embodiments for ease of understanding. The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction and operation described herein. Accordingly, other embodiments, as well as equivalents, are within the scope of the appended claims.

What is claimed is:

1. A method of stabilizing an output beam from a $CO_2$ laser pumped by radio-frequency (RF) energy modulated at a modulation frequency, comprising the steps of:

a. measuring an output power of the output beam;
   b. generating a first signal corresponding to the measured output power;
   c. removing the modulation frequency from the first signal to form a filtered first signal; and
   d. forming from the filtered first signal a modulation control signal having a varying duty cycle adapted to compensate for variations in the output power; and
   e. providing the modulation control signal to the laser to stabilize the output power.

2. The method of claim 1 wherein in step a. the output power is measured only in a central region of the output beam.

3. The method of claim 1 wherein step d. includes the steps of:

f. digitizing the filtered first signal; and
   g. inputting the digitized filtered first signal to a field-programmable gate array (FPGA); and
   h. generating the modulation control signal with the FPGA.

4. The method of claim 1 wherein:

the method further includes, following step a., the step of:
   f. comparing the measured output power to a power set-point level; and step d. forms the modulation control signal to limit the output power to the power set-point level.

* * * * *